(12) United States Patent
Axelsson et al.

(10) Patent No.: US 12,141,430 B2
(45) Date of Patent: Nov. 12, 2024

(54) SYSTEMS AND METHODS FOR MANAGING DIGITAL NOTES

(71) Applicant: 3M INNOVATIVE PROPERTIES COMPANY, St. Paul, MN (US)

(72) Inventors: Pontus Axelsson, Stockholm (SE); Nicklas A. Ansman Giertz, New York, NY (US); Michael Rotstein, Stockholm (SE); John E. Karlsson, Brooklyn, NY (US); Emre B. Ergenekon, Solna (SE)

(73) Assignee: 3M Innovative Properties Company, St. Paul, MN (US)

( * ) Notice: Subject to any disclaimer, the term of this patent is extended or adjusted under 35 U.S.C. 154(b) by 4 days.

(21) Appl. No.: 18/014,577

(22) PCT Filed: Jul. 21, 2021

(86) PCT No.: PCT/IB2021/056605
§ 371 (c)(1),
(2) Date: Jan. 5, 2023

(87) PCT Pub. No.: WO2022/023890
PCT Pub. Date: Feb. 3, 2022

(65) Prior Publication Data
US 2023/0259270 A1 Aug. 17, 2023

Related U.S. Application Data

(60) Provisional application No. 63/058,058, filed on Jul. 29, 2020.

(51) Int. Cl.
*G06F 3/0488* (2022.01)
*G06F 3/0482* (2013.01)

(52) U.S. Cl.
CPC .......... *G06F 3/0488* (2013.01); *G06F 3/0482* (2013.01)

(58) Field of Classification Search
CPC .............................. G06F 3/0488; G06F 3/0482
See application file for complete search history.

(56) References Cited

U.S. PATENT DOCUMENTS

| 10,554,827 B2 | 2/2020 | Kempa et al. |
| 2017/0032552 A1 | 2/2017 | Gilra |

(Continued)

OTHER PUBLICATIONS

International Search Report for PCT International Application No. PCT/IB2021/056605, mailed on Oct. 19, 2021, 4 pages.

(Continued)

*Primary Examiner* — Cao H Nguyen
(74) *Attorney, Agent, or Firm* — Bryan Walker

(57) ABSTRACT

Methods for managing notes, either digital notes or images of physical notes. One feature uses multiple drawing layers divided into tiles to render drawing operations. The tiles with drawing changes are rendered in new tiles while tiles without changes are used from a previous drawing layer. This feature accommodates redo and undo commands by pushing or popping a layer on the history stack of layers. Another feature uses a displayed plus button that expands upon touch to display actions. A user can touch an action to select it and, upon releasing the touch, the action is executed with respect to displayed boards of digital notes. Another feature receives a 3D model of notes from a video scan and uses a transformation matrix to convert the notes in the 3D model to corresponding digital notes.

13 Claims, 8 Drawing Sheets

(56) References Cited

U.S. PATENT DOCUMENTS

2017/0286764 A1* 10/2017 Ma .................... G06V 30/414
2018/0129363 A1*  5/2018 Axelsson ............ H04L 12/1827
2018/0268932 A1    9/2018 Shinkichi
2019/0354573 A1* 11/2019 Rothberg ............. G06F 40/103

OTHER PUBLICATIONS

Supplementary Partial European Search Report completed Jun. 24, 2024 for EP Application No. EP 21 85 0624, 13 pages.

* cited by examiner

SYSTEMS AND METHODS FOR MANAGING DIGITAL NOTES

CROSS REFERENCE TO RELATED APPLICATIONS

This application is a national stage filing under 35 U.S.C. 371 of PCT/IB2021/056605, filed Jul. 21, 2021, which claims the benefit of U.S. Provisional Application No. 63/058,058, filed Jul. 29, 2020 the disclosures of which are incorporated by reference in their entireties herein.

BACKGROUND

Paper notes have been broadly used in recording, sharing, and communicating ideas and information. For example, during a collaboration session (e.g., brainstorming session), participants write down ideas on repositionable paper notes, whiteboard, or paper, and then share with one another. In addition, people commonly use notes throughout the day to memorialize information or content which the individual does not want to forget. As additional examples, people frequently use notes as reminders of actions or events to take in the future, such as to make a telephone call, revise a document or to fill out a time sheet.

Software programs currently exist which permit computer users to create a software-based note in a digital form and to utilize the digital note within a computing environment. For example, a computer user may create a digital note and "attach" the digital note to an electronic document a desktop or electronic workspace presented by the computing environment.

SUMMARY

A first method for managing notes includes detecting a drawing operation on a digital note and, in response, adding a new drawing layer to a plurality of layers representing previous drawing operations. Each of the plurality of layers includes tiles representing portions of the drawing operations, and the tiles from a previous layer are referenced in the new drawing layer. If the detected drawing operation includes a change to a tile from the previous layer, then the method uses the tile with the change in the new drawing layer. If the detected drawing operation does not include a change to a tile from the previous layer, then the method uses the tile without the change in the new drawing layer. The drawing operation is rendered in the tiles in the new drawing layer.

A second method for managing notes includes displaying a plurality of boards, each of the boards including a grouping of digital notes. The method receives a user activation of a displayed button by sensing a touch on the button and, in response, expands the button to display an identification of actions. A selection of one of the actions is received by sensing a touch on the displayed identification of the selected action and, upon not sensing the touch, the method executes the selected action with respect to the displayed boards.

A third method for managing notes includes receiving a digital 3D model of notes and finding a plane and anchors for each of the notes. The method computes a transformation matrix, based upon the anchors, to find corners of the notes, and rotates the plane for each of the notes. The notes are converted to corresponding digital notes.

DETAILED DESCRIPTION

Overview

The present disclosure describes techniques for creating and manipulating software notes representative of physical notes. For example, techniques are described for recognizing physical notes present within a physical environment, capturing information therefrom and creating corresponding digital representations of the physical notes, referred to herein as digital notes or software-based notes. Further, at least some aspects of the present disclosure are directed to techniques for managing multiple notes.

In general, notes can include physical notes and digital notes. Physical notes generally refer to objects with a general boundary and recognizable content. Physical notes can include the resulting objects after people write, draw, or enter via other type of inputs on the objects, for example, paper, white board, or other objects accepting the inputs. By way of examples, physical notes can include hand-written repositionable paper notes, paper, or film, white-board with drawings, posters, and signs. In some cases, physical notes can be generated using digital means, e.g., printing onto printable repositionable paper notes or printed document. In some cases, one object can include several notes. For example, several ideas can be written on a piece of poster paper or a white-board. Physical notes can be two-dimensional or three dimensional. Physical notes can have various shapes and sizes. For example, a physical note may be a 3 inches×3 inches note; a physical note may be a 26 inches×39 inches poster; and a physical note may be a triangular metal sign. In some cases, physical notes have known shapes and/or sizes. Digital notes generally refer to digital objects with information and/or ideas. Digital notes can be generated using digital inputs. Digital inputs can include, for example, keyboards, touch screens, digital cameras, digital recording devices, stylus, digital pens, or the like. In some cases, digital notes may be representative of physical notes.

Note Management System

Figure 1A:
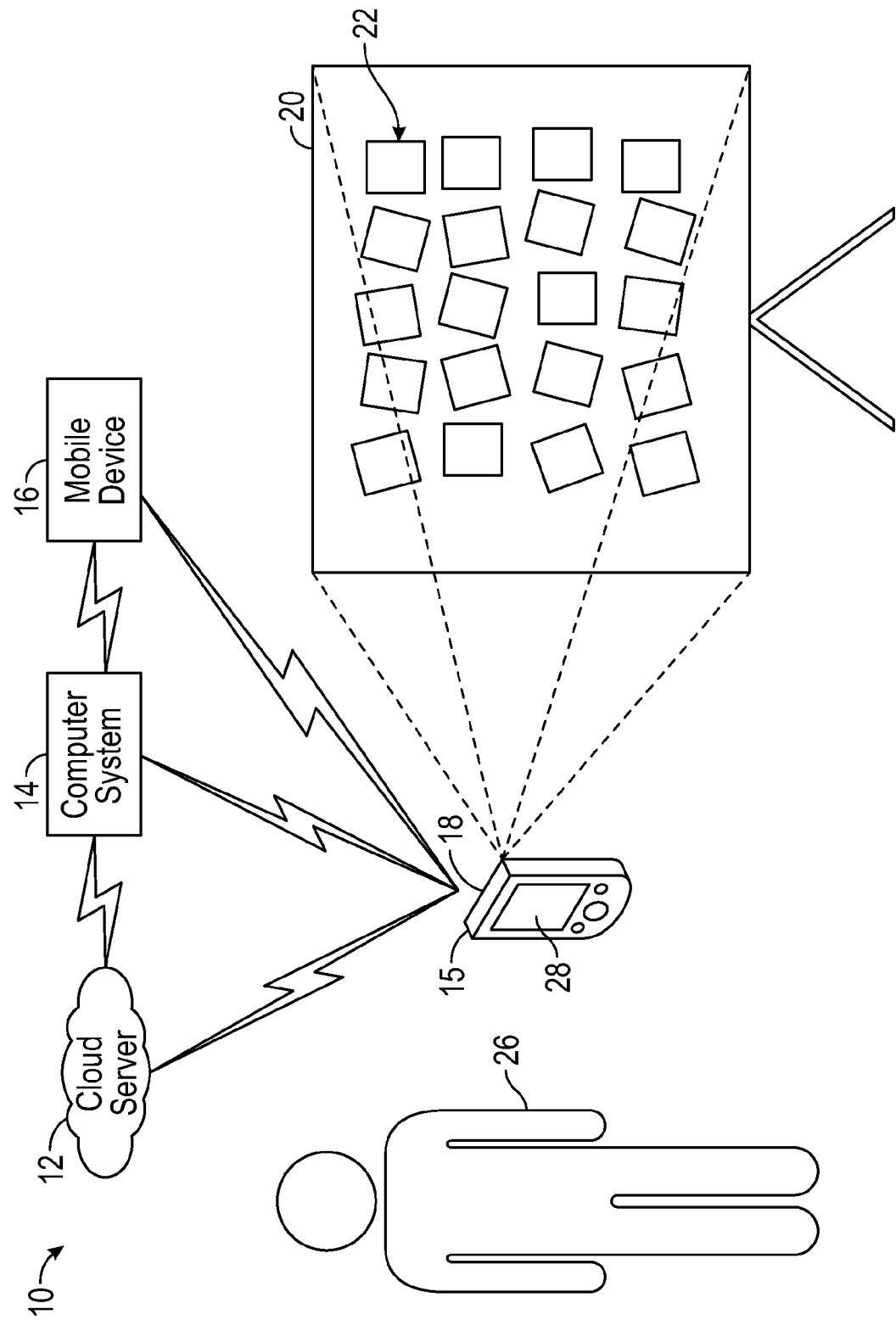
FIG. 1A is a representation illustrating one example of a user capturing an image of a workspace with notes using an image capture device on a mobile device.

FIG. 1A illustrates an example of a note recognition environment 10. In the example of FIG. 1A, environment 10 includes a mobile device 15 to capture and recognize one of more notes 22 from a workspace 20. As described herein, mobile device provides an execution environment for one or more software applications that, as described, can efficiently capture and extract note content from a large number of physical notes, such as the collection of notes 22 from workspace 20. In this example, notes 22 may be the results of a collaborative brainstorming session having multiple participants. As described, mobile device 15 and the software executing thereon may perform a variety of note-related operations, including automated creation of digital notes representative of physical notes 22 of workspace 20.

In the example implementation, mobile device 15 includes, among other components, an image capture device 18 and a presentation device 28. In addition, although not shown in FIG. 1A, mobile device 15 may include one or more processors, microprocessors, internal memory and/or data storage and other electronic circuitry for executing software or firmware to provide the functionality described herein.

In general, image capture device 18 is a camera or other component configured to capture image data representative of workspace 20 and notes 22 positioned therein. In other words, the image data captures a visual representation of an environment, such as workspace 20, having a plurality of visual notes. Although discussed as a camera of mobile device 15, image capture device 18 may comprise other components capable of capturing image data, such as a video recorder, an infrared camera, a CCD (Charge Coupled Device) array, a laser scanner, or the like. Moreover, the captured image data can include at least one of an image, a video, a sequence of images (i.e., multiple images taken within a time period and/or with an order), a collection of images, or the like, and the term input image is used herein to refer to the various example types of image data.

Presentation device 28 may include, but not limited to, an electronically addressable display, such as a liquid crystal display (LCD) or other type of display device for use with mobile device 28. In some implementations, mobile device 15 generates the content to display on presentation device 28 for the notes in a variety of formats, for example, a list, grouped in rows and/or column, a flow diagram, or the like. Mobile device 15 may, in some cases, communicate display information for presentation by other devices, such as a tablet computer, a projector, an electronic billboard or other external device.

As described herein, mobile device 15, and the software executing thereon, provide a platform for creating and manipulating digital notes representative of physical notes 22. For example, in general, mobile device 15 is configured to process image data produced by image capture device 18 to detect and recognize at least one of physical notes 22 positioned within workspace 20. In some examples, the mobile device 15 is configured to recognize note(s) by determining the general boundary of the note(s). After a note is recognized, mobile device 15 extracts the content of at least one of the one or more notes, where the content is the visual information of note 22.

In some example implementations, mobile device 15 provides functionality by which user 26 is able to export the digital notes to other systems, such as cloud-based repositories (e.g., cloud server 12) or other computing devices (e.g., computer system 14 or mobile device 16).

In the example of FIG. 1A, mobile device 15 is illustrated as a mobile phone. However, in other examples, mobile device 15 may be a tablet computer, a personal digital assistant (PDA), a laptop computer, a media player, an e-book reader, a wearable computing device (e.g., a watch, eyewear, a glove), or any other type of mobile or non-mobile computing device suitable for performing the techniques described herein.

Figure 1B:
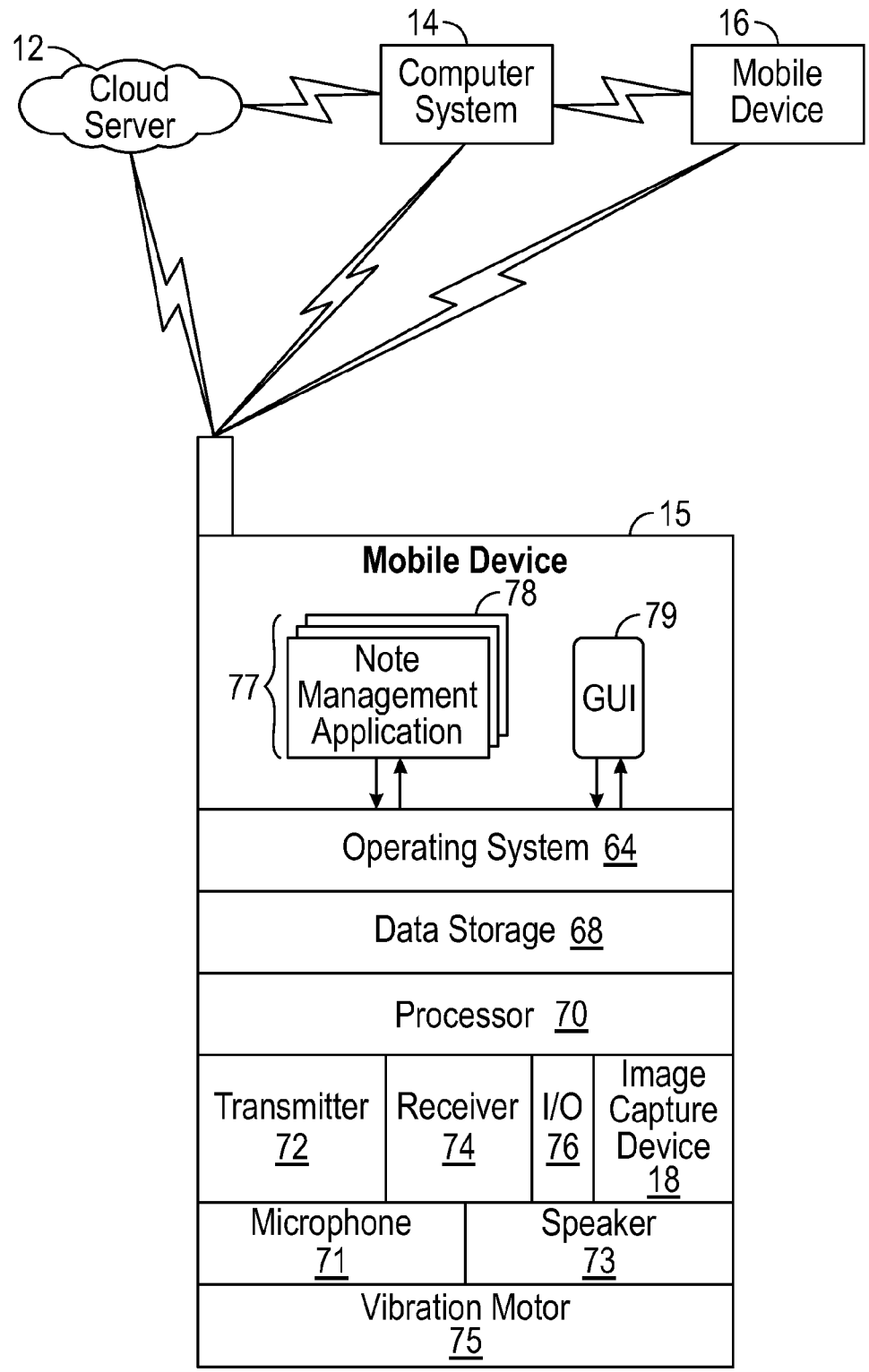
FIG. 1B is a block diagram illustrating one example of the mobile device.

FIG. 1B illustrates a block diagram illustrating an example of a mobile device that operates in accordance with the techniques described herein. For purposes of example, the mobile device of FIG. 1B will be described with respect to mobile device 15 of FIG. 1A.

In this example, mobile device 15 includes various hardware components that provide core functionality for operation of the device. For example, mobile device 15 includes one or more programmable processors 70 configured to operate according to executable instructions (i.e., program code), typically stored in a computer-readable medium or data storage 68 such as static, random-access memory (SRAM) device or Flash memory device. I/O 76 may include one or more devices, such as a keyboard, camera button, power button, volume button, home button, back button, menu button, or presentation device 28 as described in FIG. 1A. Transmitter 72 and receiver 74 provide wireless communication with other devices, such as cloud server 12, computer system 14, or other mobile device 16 as described in FIG. 1A, via a wireless communication interface as described in FIG. 1A, such as but not limited to high-frequency radio frequency (RF) signals. A microphone 71 converts audio information into corresponding electrical signals. A speaker 73 converts electrical signals into corresponding audio information. A vibration motor 75 is used to cause mobile device 15, or housing for it, to vibrate. Mobile device 15 may include additional discrete digital logic or analog circuitry not shown in FIG. 1B.

In general, operating system 64 executes on processor 70 and provides an operating environment for one or more user applications 77 (commonly referred to "apps"), including note management application 78. User applications 77 may, for example, comprise executable program code stored in computer-readable storage device (e.g., data storage 68) for execution by processor 70. As other examples, user applications 77 may comprise firmware or, in some examples, may be implemented in discrete logic.

In operation, mobile device 15 receives input image data and processes the input image data in accordance with the techniques described herein. For example, image capture device 18 may capture an input image of an environment having a plurality of notes, such as workspace 20 of FIG. 1A having of notes 22. As another example, mobile device 15 may receive image data from external sources, such as cloud server 15, computer system 14 or mobile device 16, via receiver 74. In general, mobile device 15 stores the image data in data storage 68 for access and processing by note management application 78 and/or other user applications 77.

As shown in FIG. 1B, user applications 77 may invoke kernel functions of operating system 64 to output a graphical user interface (GUI) 79 for presenting information to a user of mobile device. As further described below, note management application 78 may construct and control GUI 79 to provide an improved electronic environment for generating and manipulating corresponding digital notes representative of physical notes 22. For example, note management application 78 may construct GUI 79 to include mechanisms that allows user 26 to easily control events that are automatically triggered in response to capturing notes of certain characteristics. In addition, note management application 78 may construct GUI 79 to include mechanisms that allow user 26 to manage relationships between groups of the digital notes.

Figure 1C:
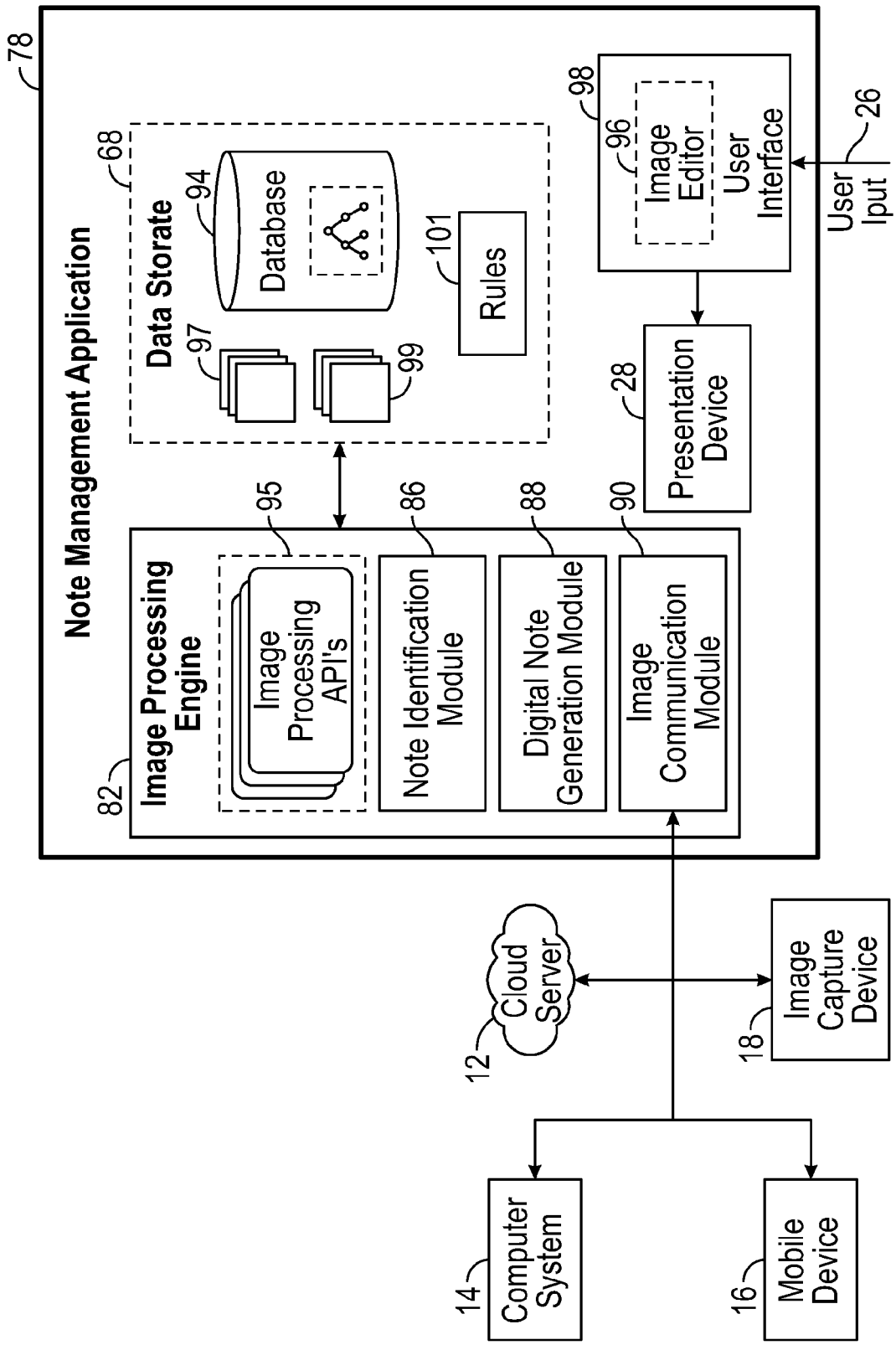
FIG. 1C is a block diagram illustrating one example of a note management application executing on the mobile device.

FIG. 1C is a block diagram illustrating one example implementation of note management application 78 that operates in accordance with the techniques described herein. Although described as a user application 77 executing on mobile device 15, the examples described herein may be implemented on any computing device, such as cloud server 12, computer system 14, or other mobile devices.

In this example, note management application 78 includes image processing engine 82 that provides image processing and object recognition functionality. Image processing engine 82 may include image communication module 90, note identification module 86 and digital note generation module 88. In addition, image processing engine 82 includes image processing Application Programming Interfaces (APIs) 95 that provide a library of image manipulation functions, e.g., image thresholding, masking, filtering, edge detection, and the like, for use by the other components of image processing engine 82.

In general, image data may be stored in data storage device 68. In this example, note management application 78 stores images 97 within data storage device 68. Each of images 97 may comprise pixel data for environments having a plurality of physical images, such as workspace 20 of FIG. 1A.

As described herein, note identification module 86 processes images 97 and identifies (i.e., recognizes) the plurality of physical notes in the images. Digital note generation module 88 generates digital notes 99 corresponding to the physical notes recognized within the images 97. For example, each of digital notes 99 corresponds to one of the physical notes identified in an input image 97. During this process, digital note generation module 88 may update database 94 to include a record of the digital note, and may store within the database information (e.g., content) extracted from the input image within boundaries determined for the physical note as detected by note identification module 86. Moreover, digital note generation module 88 may store within database 94 metadata associating the digital notes into one or more groups of digital notes.

Further, note management application 78 may be configured, e.g., by user input 26, to specify rules 101 that trigger actions in response to detection of physical notes having certain characteristics. For example, user interface 98 may, based on the user input, map action to specific characteristics of notes. Note management application 78 may output user interface 98 by which the user is able to specify rules having actions, such as a note grouping action, or an action related to another software application executing on the mobile device, such as an action related to a calendaring application. For each rule, user interface 98 allows the user to define criteria for triggering the actions. During this configuration process, user interface 98 may prompt the user to capture image data representative of an example note for triggering an action and process the image data to extract characteristics, such as color or content. User interface 98 may then present the determined criteria to the user to aid in defining corresponding rules for the example note.

Image communication module 90 controls communication of image data between mobile device 15 and external devices, such as cloud server 12, computer system 14, mobile device 16, or image capture device 18. In some examples, image communication module 90 may, for example, allow a user to communicate processed or unprocessed images 97 of environments and/or digital notes and associated information extracted therefrom including metadata from database 68. In some examples, image communication module 90 exports this data to a zip file that may be communicated by FTP, HTTP, email, Bluetooth or other mechanism.

In the example of FIG. 1C, note management application 78 includes user interface 98 that constructs and controls GUI 79 (FIG. 1B). As described below, user interface 98 may, in some examples, output for display an input image 97 overlaid with the plurality of digital notes 99, where each of the digital notes is overlaid in place of a corresponding physical note. In addition, user interface 98 may display a group of digital notes 99 that has been designated by the user. This group of digital notes 99 may be, for example, a subset of the digital notes recognized in a particular input image 97. User interface 98 may display this designated group (set) of the digital notes on a second portion of GUI 79 and allow user 26 to easily add or remove digital notes 99 from the designated group.

In some example implementations, user interface 98 provides an image editor 96 that allows a user to edit the overlay image and/or the digital notes. In another example, digital note generation module 88 may include a process or processes that enhances the extracted information from the input image.

Figure 1D:
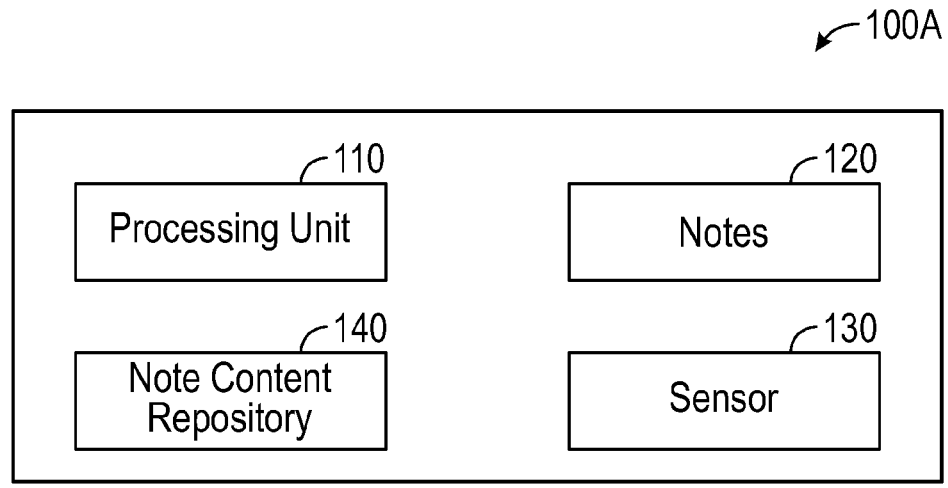
FIG. 1D illustrates another embodiment of a note recognition system.

FIG. 1D illustrates another example embodiment of a note recognition system 100A. The system 100A can include a processing unit 110, one or more notes 120, a sensor 130, and note content repository 140. The processing unit 110 can include one or more processors, microprocessors, computers, servers, and other computing devices. The sensor 130, for example, an image sensor, is configured to capture a visual representation of a scene having the one or more notes 120. The sensor 130 can include at least one of a camera, a video recorder, an infrared camera, a CCD (Charge Coupled Device) array, a scanner, or the like. The visual representation can include at least one of an image, a video, a sequence of images (i.e., multiple images taken within a time period and/or with an order), a collection of images, or the like. The processing unit 110 is coupled to the sensor 130 and configured to receive the visual representation. In some cases, the processing unit 110 is electronically coupled to the sensor 130. The processing unit 110 is configured to recognize at least one of the one or more notes 120 from the visual representation. In some embodiments, the processing unit 110 is configured to recognize note(s) by determining the general boundary of the note(s). After a note is recognized, the processing unit 110 extracts the content of the note. In some cases, the processing unit 110 is configured to recognize and extract the content of more than one note from a visual representation of a scene having those notes.

In some cases, the processing unit 110 can execute software or firmware stored in non-transitory computer-readable medium to implement various processes (e.g., recognize notes, extract notes, etc.) for the system 100A. The note content repository 140 may run on a single computer, a server, a storage device, a cloud server, or the like. In some other cases, the note content repository 140 may run on a series of networked computers, servers, or devices. In some implementations, the note content repository 140 includes tiers of data storage devices including local, regional, and central. The notes 120 can include physical notes arranged orderly or randomly in a collaboration space and the sensor 130 generates a visual representation of the notes 120 in the collaboration space.

In some implementations, the note recognition system 100A can include a presentation device (not shown in FIG. 1D) to show to the user which notes are recognized and/or which notes' content have been extracted. Further, the note recognition system 100A can present the extracted content via the presentation device. In some embodiments, the processing unit 110 can authenticate a note before extracting the content of the note. If the note is authenticated, the content will be extracted and stored in the note content repository 140.

Figure 1E:
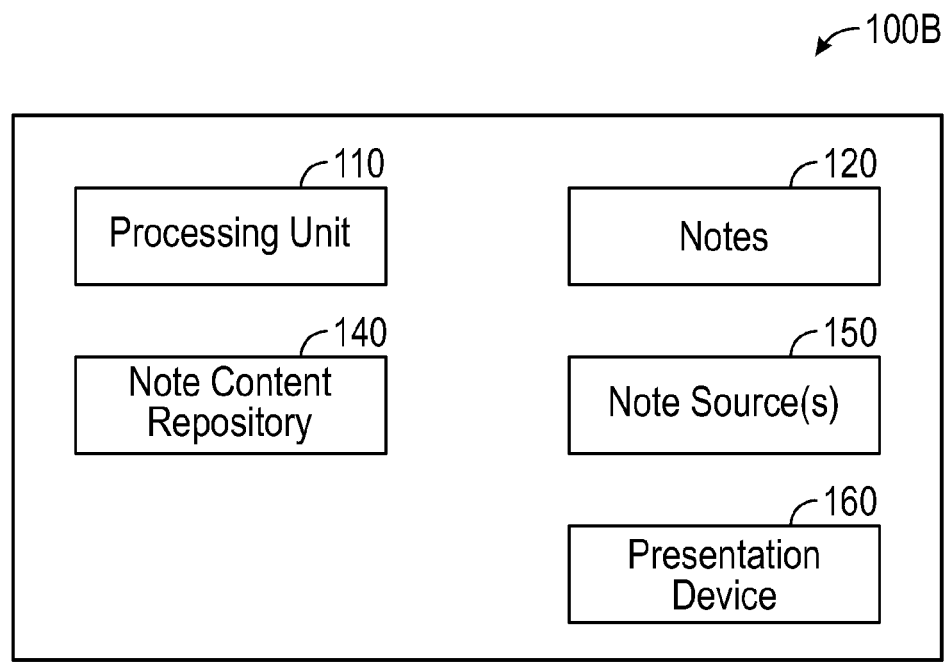
FIG. 1E illustrates another embodiment of a note management system.

FIG. 1E illustrates an embodiment of a note management system 100B. In this embodiment, the note management system 100B includes processing unit 110, one or more notes 120, one or more note sources 150, and a note content repository 140. In some cases, the system 100B includes a presentation device 160. The processing unit 110, the notes 120, and the note content repository 140 are similar to the components for the note recognition system 100A as illustrated in FIG. 1A. The note sources 150 can include sources to provide content of physical notes, such as a visual representation of a scene having one or more notes, and sources to provide content of digital notes, such as a data stream entered from a keyboard. In some embodiments, the note management system 100B includes a first source and a second source, and the first source is a visual representation of a scene having one or more notes 120. The first source and the second source are produced by different devices. The second source includes at least one of a text stream, an image, a video, a file, and a data entry. The processing unit 110 recognizes at least one of the notes from the first source and extracts the content of the note, as discussed in the note recognition system 100A. In some cases, the processing unit 110 labels the note with a category. The processing unit 110 can label a note based on its specific shape, color, content, and/or other information of the note. For example, each group of note can have a different color (e.g., red, green, yellow, etc.).

In some embodiments, the note management system 100B can include one or more presentation devices 160 to show the content of the notes 120 to the user. The presentation device 160 can include, but not limited to, an electronically addressable display, such as a liquid crystal display (LCD), a tablet computer, a projector, an electronic billboard, a cellular phone, a laptop, or the like. In some implementations, the processing unit 110 generates the content to display on the presentation device 160 for the notes in a variety of formats, for example, a list, grouped in rows and/or column, a flow diagram, or the like.

Various components of the note recognition system and note management system, such as processing unit, image sensor, and note content repository, can communicate via a communication interface. The communication interface includes, but not limited to, any wired or wireless short-range and long-range communication interfaces. The short-range communication interfaces may be, for example, local area network (LAN), interfaces conforming to a known communications standard, such as Bluetooth standard, IEEE 802 standards (e.g., IEEE 802.11), a ZigBee or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Editing Notes

An editing algorithm allows a user to both create digital notes and to edit both captured and digitally created notes. Some examples of editing operations include: changing the background color of the note while preserving the content; erasing both analog and digital content; adding a digital drawing; and adding digital text. These features require a substantial amount of memory, especially drawing and erasing since the algorithm allows a user to undo and redo individual drawing operations. This problem is particularly challenging on low end devices with limited memory.

To solve this problem a tiling algorithm is used that allows an efficient use of memory and provides the user a deep undo-buffer. The tiling algorithm works by dividing the note image into smaller pieces, each 256×256 pixels large for example. Each drawing operation, defined as starting when a touch operation begins (e.g., the user's fingers or a stylus starts touching the display screen) until it ends (e.g., the user's fingers or a stylus is lifted from the display screen), starts a new drawing layer. Each layer has a grid of tiles to cover the entire image as rendered on a display device such as GUI 79. The tiles are reference counted meaning that multiple layers can refer to the same tile(s).

When a new layer is created, a reference to all the tiles in the previous layer is created. When a stroke (drawing operation) is added to the new layer the tile or tiles with a change are rendered in the new layer so as to not affect the previous layer. When a layer is discarded the tiles in that layer are recycled by clearing the rendered pixels in those tiles and putting into a tile pool for future use. The tile pool is limited in size and, if no tiles remain in the tile pool, previous drawing layers are flattened and recycled to free up tiles.

Figure 2A:
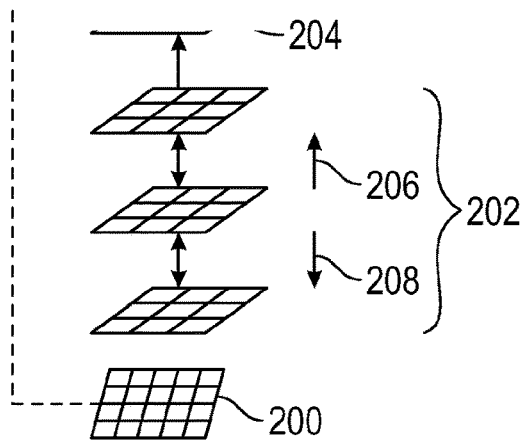
FIG. 2A illustrates an editing method for digital notes.

FIG. 2A illustrates this tiling algorithm for editing digital notes. A new layer 204 is created upon detecting a drawing operation and copies one or more tiles from the previous layer using tiles from tile pool 200. New layer 204 is displayed as the currently rendered layer (e.g., displayed on GUI 79 in mobile device 15). The layers 202 represent the previous rendered layers. For new layer 204, only tiles with a drawing change are rendered in layer 204, and the tiles without a change are used from one of the previous layers. Rendered layers 202 are generally stored in a time sequential manner representing an order in which the layers were created in response to drawing operations, and rendered layers 202 form or represent a history stack of layers. A redo operation 206 involves pushing a layer on the history stack to render and display one of the next layers. An undo operation 208 involves popping a layer on the history stack to render and display one of the previous layers. The number of rendered layers can depend upon, for example, an amount of available memory. For example, the tiling algorithm can use 20-25 layers, which allows for 20-25 undo operations. The rendered layers in FIG. 2A show nine tiles for illustrative purposes only; each layer can be divided into 256×256 pixels as the tiles or other numbers of tiles as N×N or M×N pixels.

The tiling algorithm not only helps with memory management but also rendering performance. Uploading images to the graphical processing unit (e.g., imaging processing engine 82) for rendering can require substantial amount of time. Making the images smaller reduces the required bandwidth for uploading them and helps with not having to upload the entire digital note for every added stroke or drawing operation.

Figure 2B:
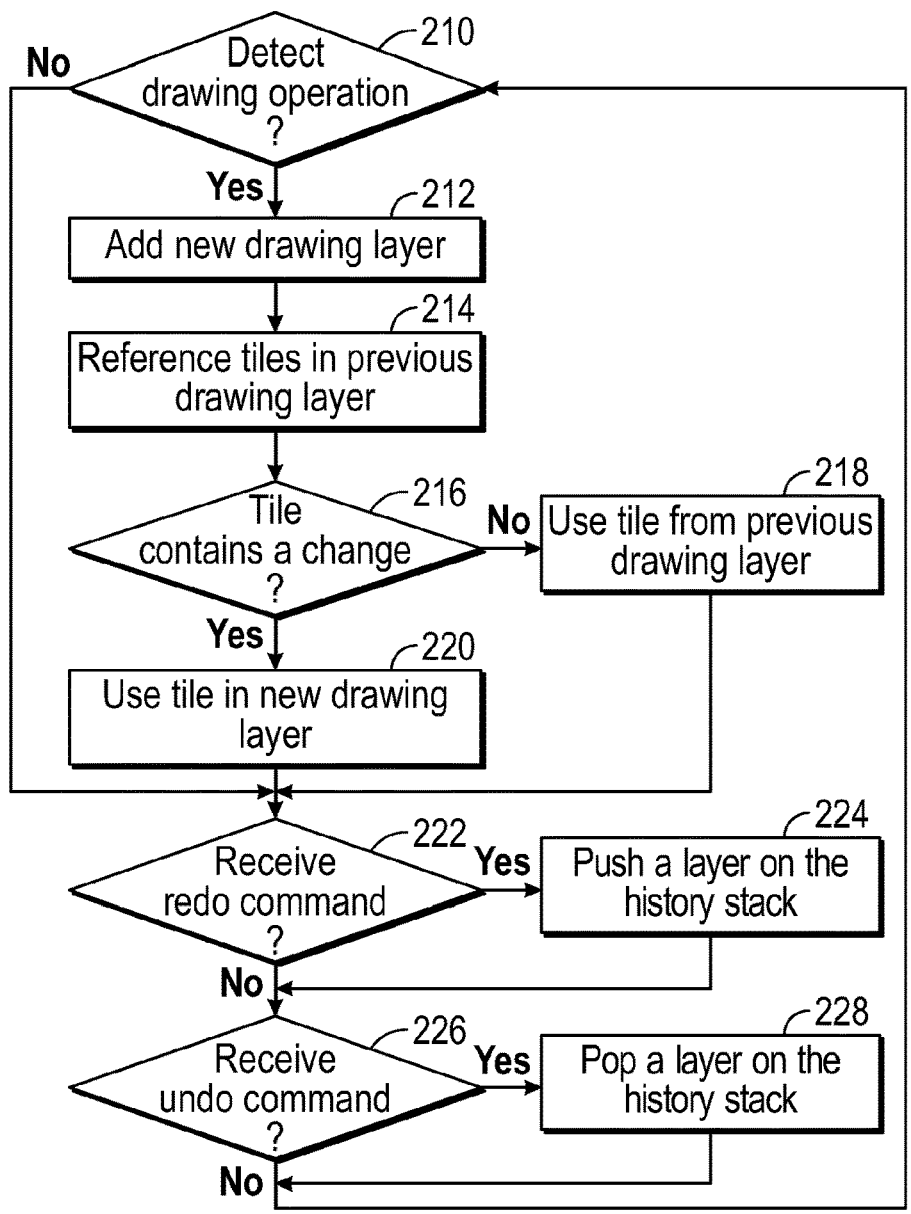
FIG. 2B is a flow chart of an editing method for digital notes.

FIG. 2B is a flow chart of an editing method for digital notes using the tiling algorithm. This method can be implemented in software or firmware for execution by processor 70 in mobile device 15. This method includes detecting a drawing operation as identified above (step 210) and adding a new drawing layer (step 212) with a reference to tiles in the previous layer (step 214). If a tile in the new layer contains a change (step 216), then the tile with the change is used in the new layer (step 220). If the tile in the new layer does not contain a change (step 216), then the method uses the corresponding tile from one of the previous layers (step 218), which can include the most recent previous layer or other previous layers in rendered layers 202.

If the method receives a redo command (step 222), then it pushes a layer on the history stack of layers for a currently rendered layer (step 224). If the method receives an undo command (step 226), then it pops a layer on the history stack of layers for a currently rendered layer (step 228).

User Interaction for Notes

The plus button is a user interaction where a round button expands on touch by a user's finger to reveal and display additional actions. The user can, without releasing their finger, select an action and when the finger is lifted the action is triggered. The user can alternatively use a stylus or other touch device instead of a finger to use the plus button feature.

Figure 3A:
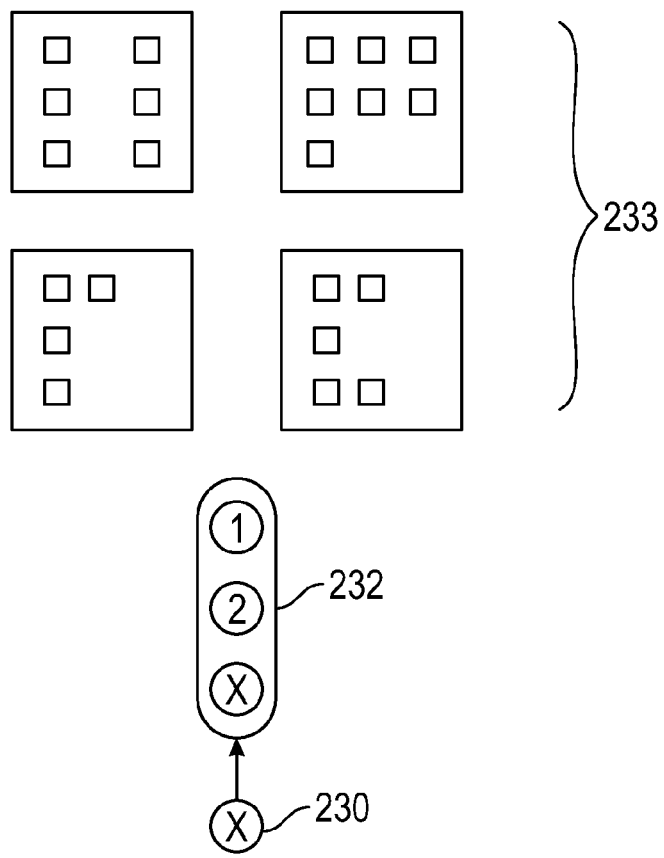
FIG. 3A illustrates a plus button feature for digital notes.

FIG. 3A illustrates this plus button feature for digital notes. This feature is used in conjunction with displayed boards of notes 233, where each board displays thumbnail images of digital notes for that board in a grid view, for example. Each board can also include, for example, a particular category or type of digital notes for that board along with a label identifying the category. Upon touching a button 230 (e.g., displayed on GUI 79 in mobile device 15), the button expands 232 to reveal additional actions 1 and 2. A user can select one of the actions 1 or 2 and, upon releasing their finger, the selected action 1 or 2 is performed with respect to board of notes 233. Examples of such actions include: creating a new board; adding a note; and adding an animation. The actions 1 and 2 can be identified or represented by, for example, particular icons or text. Only two actions are shown for illustrative purposes only; additional actions can be included in the plus button feature. The plus button can be shown as a particular icon or descriptor, and the term "plus" is used as a label only.

Figure 3B:
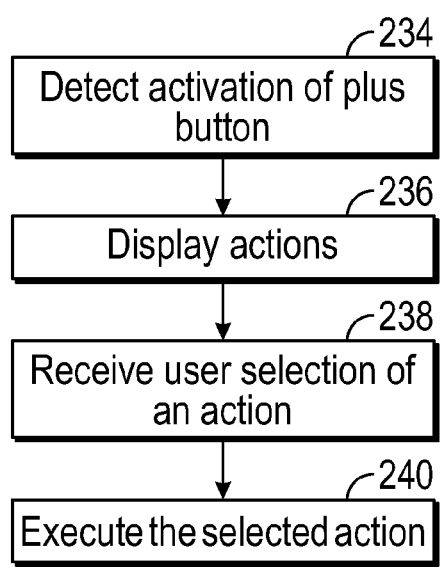
FIG. 3B is a flow chart of a plus button method for digital notes.

FIG. 3B is a flow chart of a method for the plus button feature for digital notes. This method can be implemented in software or firmware for execution by processor 70 in mobile device 15. This method includes detecting activation of plus button 230 (step 234) via a user touching the button and, in response, expanding plus button 232 to display identifications of actions 1 and 2 (step 236). The method receives the user's section of an action (e.g., action 1 or 2) via the user touching the corresponding identification and then releasing their touch from the selected action (step 238), and the method executes the selected action with respect to the user's boards upon sensing the release of the touch from the selected action (step 240). The release of the touch from the selected action can also be accompanied by an animation as the action is executed.

Video Capture for Note Detection

Instead of capturing notes in images as still pictures, this algorithm provides for capturing notes using a video where the user would move a device (e.g., mobile device 15) around to make a video of multiple physical notes, which allows capturing a much greater number of notes with potentially higher resolution. This feature requires the algorithm to build a 3D model of the environment and identify the position of the notes without requiring printed markers or other visual landmarks.

Figure 4A:
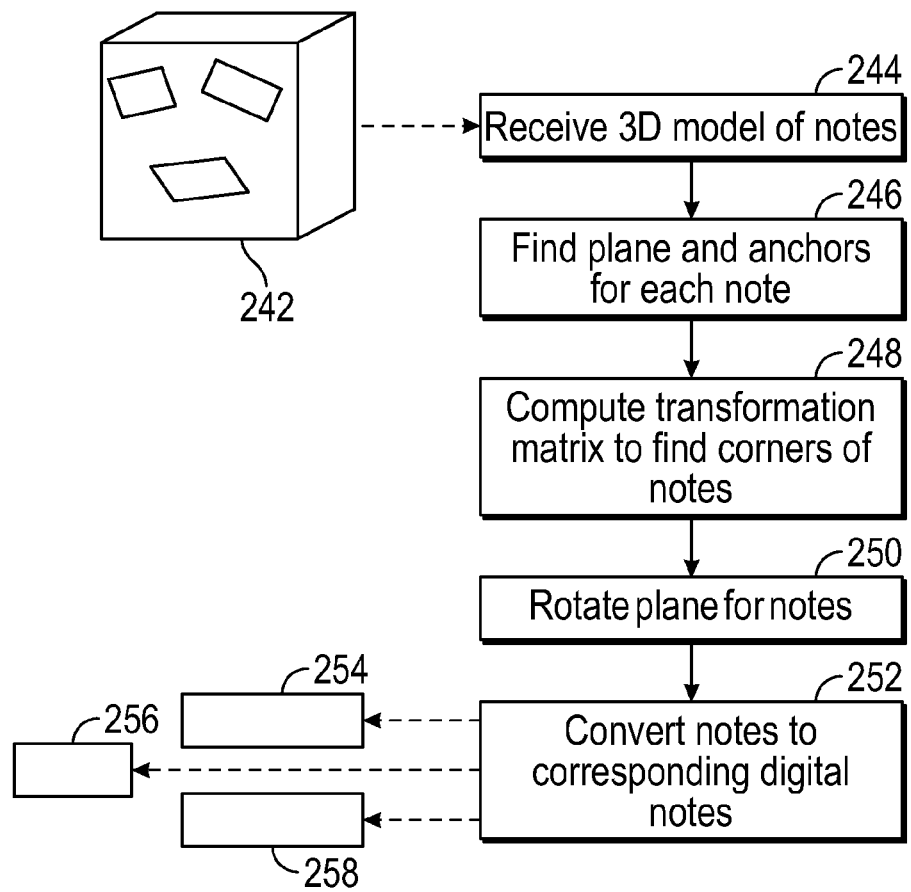
FIG. 4A is a flow chart of a video capture method to convert digital notes from a 3D model.

FIG. 4A is a flow chart of a video capture method to convert digital notes from a 3D model. This method can be implemented in software or firmware for execution by processor 70 in mobile device 15. This method includes receiving a digital three-dimensional (3D) model of notes 242 (step 244). In this example, 3D model 242 includes three notes from a video scan as shown; the 3D model can include more or fewer notes captured from a video. This 3D model can be generated by a user taking a video scan of multiple physical notes and using existing applications to convert the video scan into a corresponding 3D model. An example of a software application to make a 3D model from a video is the Capture: 3D Scan Anything product by Standard Cyborg, Inc. Other software applications are available for generating a 3D or an augmented reality (AR) model from a video scan.

The method finds the plane and anchors for each note in 3D model 242 (step 246). The anchors include reference objects or other landmarks in the 3D model, and the plane for each note is typically aligned to the anchors or other reference objects. The method computes a transformation matrix to find the corners of the notes in 3D model 242 (step 248) and rotates the plane for each of the notes (step 250). Finding the corners of the notes is used to determine or estimate a size for each of the notes, and the plane of each note is rotated such that the note appears captured from a front non-angled view. The notes from 3D model 242 are then converted to corresponding digital notes 254, 256, and 258 (step 252), where the digital notes have a size corresponding with the notes in 3D model 242 and include a digital version of content from the scanned physical notes.

To be able to determine the size of a physical note in 3D model 242, an algorithm can be used to implement the transformation matrix (step 248) and rotate the planes (step 250) in the method of FIG. 4A. After executing the algorithm, the method has a collection of "notes," roughly rectangular shapes defined by four corners. These rectangles will vary in shape and size, even if all the physical notes are the same size: in the capture image, their shapes will be distorted by perspective, and the corner positions reported by the algorithm might not be 100% accurate.

To be able to correctly determine which physical sizes that the digital notes in the 3D model correspond to, the digital notes are perspective corrected, that is the positions of the corners are re-calculated so that they appear as if they were captured straight from the front (not at a non-zero angle from the front). This is done using the following search:

1. For every camera angle along the X and Y axes, from a minimum to a maximum, the note corners are re-calculated according to a projection matching the camera angle, and a score is computed. (Example: starting at −55 degrees and ending at 55 degrees, re-calculate note corners at every 2nd degree step, that is start at −55, then −53, then −51, etc.), see FIG. 4B.
2. The score is designed to maximize "squareness" in the digital notes, that is that the corner angles are as close to 90 degrees as possible, that the length of the vertical edges are as similar as possible, and that the horizontal edges are as similar as possible.

Figure 4B:
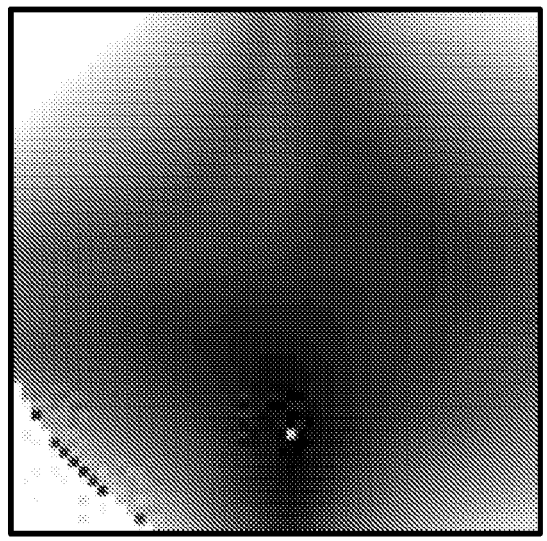
FIG. 4B illustrates an output of a projection search resulting from use of a scoring algorithm.

FIG. 4B shows an output from the projection search. Each point is the result of the scoring for a combination of X and Y values. Darker means a better score. The lighter colored point within the search space is the one with the best score.

Figure 4C:
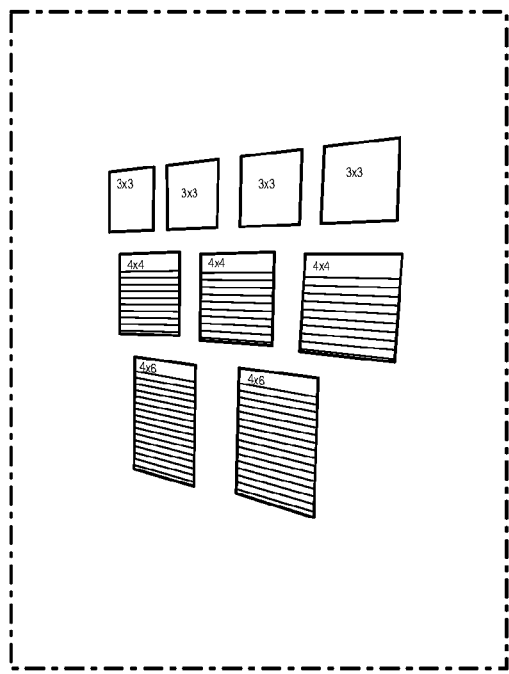
FIG. 4C is a capture image of notes taken at an angle.
Figure 4D:
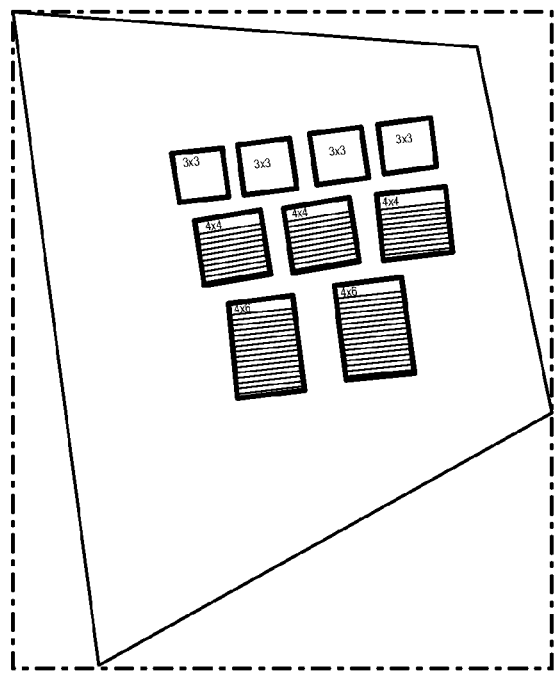
FIG. 4D is the capture image of FIG. 4C but with the perspective transformed to appear as if the image were from the front not at an angle.

FIG. 4C is a capture image of notes taken at an angle (non-zero angle from a front view) and captured in a 3D model. FIG. 4D is the capture image of FIG. 4C but with the perspective transformed to appear as if the image were from the front not at an angle.

The projection angle with the best score is chosen for the next step, which includes finding the combination of note sizes that best corresponds to the aspect ratios of the individual notes, and their relative sizes as follows:

1. For each note, calculate the closest note sizes, based on the aspect ratio. The closest size classes are the ones that have similar aspect ratios to the digital note. For example, a note with aspect ratio 0.98 would be very close to all square note sizes, which have aspect ratio 1. A note that has a 1.28 aspect ratio would be close enough to both 8×6 (which has aspect ratio 1.25) and 6×4 (which has aspect ratio 1.33). For each of the size classes, calculate a pixels per inch value, that is how large a physical area each pixel would represent if the note size is the correct one.
2. For each of the calculated pixel per inch values, calculate the best matching size class for each note, and compute a total error, based on the differences in area and aspect ratio between the physical note and the calculated values for the digital note.
3. Select the classification with the smallest total error. The selected classification can be assigned to the note in order to generate a corresponding digital note having a size based upon the selected classification.

The invention claimed is:

1. A computer-implemented method comprising:
   detecting a drawing operation on a digital note;
   in response to the detecting, adding a new drawing layer to a plurality of layers representing previous drawing operations, wherein each of the plurality of layers includes tiles representing portions of the drawing operations;
   referencing tiles from a previous layer in the new drawing layer;
   if the detected drawing operation includes a change to a tile from the previous layer, then using the tile with the change in the new drawing layer;
   if the detected drawing operation does not include a change to a tile from one of the previous layers, then using the tile without the change in the new drawing layer; and
   rendering the drawing operation in the tiles in the new drawing layer.

2. The method of claim 1, further comprising:
   receiving a redo command; and
   in response to the receiving, pushing a layer on a history stack, wherein the history stack represents previously rendered layers.

3. The method of claim 1, further comprising:
   receiving an undo command; and
   in response to the receiving, popping a layer on a history stack, wherein the history stack represents previously rendered layers.

4. The method of claim 1, wherein the plurality of layers are each divided into N×N pixels to form the tiles.

5. The method of claim 1, wherein the plurality of layers includes at least twenty layers.

6. The method of claim 1, wherein detecting further comprises sensing when a touch operation begins and when the touch operation ends.

7. The method of claim 1, further comprising detecting that one of the layers is discarded and, in response, making tiles from the discarded layer available for a new layer.

8. A computer-implemented method comprising:
   displaying a plurality of boards, wherein each of the boards includes a grouping of digital notes;
   receiving a user activation of a displayed button by sensing a touch on the button;
   in response to the receiving the user activation, expanding the button to display an identification of actions;
   receiving a selection of one of the actions by sensing a touch on the displayed identification of the selected action; and
   upon not sensing the touch on the displayed identification of the selected action, executing the selected action with respect to the displayed boards.

9. The method of claim 8, wherein the identification of actions includes creating a new board, adding a note, or adding an animation.

10. The method of claim 8, further comprising displaying icons as the identification of actions.

11. The method of claim 8, further comprising displaying an animation as the action is executed.

12. A method for displaying a user interface on an electronic display device, wherein:
   a first portion of the user interface displays a plurality of boards, wherein each of the boards includes a grouping of digital notes;
   a second portion of the user interface displays a button;
   upon sensing a touch on the button, the user interface expands the button to display an identification of actions;
   a selection of one of the actions is received by sensing a touch on the displayed identification of the selected action; and
   upon not sensing the touch on the displayed identification of the selected action, the selected action is executed with respect to the displayed boards.

13. The method of claim 12, wherein the user interface displays an animation as the action is executed.

* * * * *